(12) United States Patent
Ma et al.

(10) Patent No.: US 11,681,547 B2
(45) Date of Patent: *Jun. 20, 2023

(54) FILE OPERATION TASK OPTIMIZATION (71) Applicant: Google LLC, Mountain View, CA (US)

(72) Inventors: Chi Ma, Palo Alto, CA (US); Kenneth J. Goldman, Palo Alto, CA (US); Yonggang Zhao, Palo Alto, CA (US); Stephen P. G. Gildea, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,381

(22) Filed: May 27, 2021

(65) Prior Publication Data

US 2021/0279098 A1 Sep. 9, 2021

Related U.S. Application Data (63) Continuation of application No. 16/451,829, filed on Jun. 25, 2019, now Pat. No. 11,036,547, which is a
(Continued)

(51) Int. Cl.
*G06F 16/182* (2019.01)
*G06F 16/16* (2019.01)
*G06F 9/48* (2006.01)

(52) U.S. Cl.
CPC .......... *G06F 9/4881* (2013.01); *G06F 9/4887* (2013.01); *G06F 16/16* (2019.01); *G06F 16/182* (2019.01)

(58) Field of Classification Search
CPC ...... G06F 9/4881; G06F 16/182; G06F 16/16; G06F 9/4887; G06F 17/30194; G06F 17/30115
(Continued)

(56) References Cited

U.S. PATENT DOCUMENTS 5,535,322 A * 7/1996 Hecht ..................... G06F 16/40
707/E17.009
7,451,447 B1 11/2008 Deshpande
(Continued)

OTHER PUBLICATIONS

Burak Guzel: "Scheduling Tasks with Cron Jobs", (Jan. 26, 2010, retrieved Jun. 6, 2022 4 PM from <<https://code.tutsplus.com/tutorials/scheduling-tasks-with-cron-jobs--net-8800>>, hereafter "Guzel" (Year: 2010).*
(Continued)

*Primary Examiner* — Kuen S Lu
(74) *Attorney, Agent, or Firm* — Honigman LLP; Brett A. Krueger (57) ABSTRACT A method includes receiving, by a data processing apparatus, a plurality of file operation requests, each file operation request including a priority, a deadline, and an operation type and representing a request to perform an operation on at least one file maintained in a distributed file system; identifying, by the data processing apparatus, a group of file operation requests to be executed together from the plurality of file operation requests, the identification based at least in part on at least one of: the file operations in the group of file operations being directed to a same storage system, or file operations in the group of file operations sharing a common operation type; and sending a request to execute the group of file operation requests to a system configured to perform the group of file operation requests.

20 Claims, 5 Drawing Sheets

Related U.S. Application Data continuation of application No. 15/266,177, filed on Sep. 15, 2016, now Pat. No. 10,338,961, which is a continuation of application No. 14/089,588, filed on Nov. 25, 2013, now Pat. No. 9,449,018.

(58) Field of Classification Search
USPC ......................................................... 707/827
See application file for complete search history.

(56) References Cited

U.S. PATENT DOCUMENTS

| | | |
|---|---|---|
| 7,730,071 B2 | 6/2010 | Iwasaki et al. |
| 8,762,416 B1 | 6/2014 | Corbett |
| 8,862,820 B2 | 10/2014 | Colgrove et al. |
| 8,863,137 B2 | 10/2014 | Keller et al. |
| 8,997,096 B1 | 3/2015 | Protopopov et al. |
| 9,189,402 B1 | 11/2015 | Smaldone et al. |
| 2004/0255048 A1* | 12/2004 | Lev Ran .............. H04L 67/1095 709/201 |
| 2005/0289394 A1 | 12/2005 | Arrouye et al. |
| 2007/0067595 A1 | 3/2007 | Ghose |
| 2014/0173148 A1 | 6/2014 | Ma et al. |
| 2014/0181436 A1 | 6/2014 | Modzelewski et al. |

OTHER PUBLICATIONS

Shibata et al., "File-Access Patterns of Data-Intensive Workflow Applications and their Implications to Distributed Filesystems", Proceedings of the 19th ACM International Symposium on High Performance Distributed Computing, Published in 2010, pp. 746-755.

Shenoy et al., "Cello: A Disk Scheduling Framework for Next Generation Operating Systems", ACM SIGMETRICS 98 Conference, Jun. 1998, 22 pages.

Sharma et al., "A Survey of Job Scheduling and Resource Management in Grid Computing", World Academy of Science, Engineering and Technology 40, Published in 2010, pp. 461-466.

Omara et al., "Genetic Algorithms for Task Scheduling Problem", J. Parallel Distrib. Comput. 70, Published in 2010, pp. 13-22.

* cited by examiner

FILE OPERATION TASK OPTIMIZATION

CROSS REFERENCE TO RELATED APPLICATIONS

This U.S. Patent Application is a continuation of, and claims priority under 35 U.S.C. § 120 from, U.S. patent application Ser. No. 16/451,829, filed on Jun. 25, 2019, which is a continuation of U.S. patent application Ser. No. 15/266,177, filed on Sep. 15, 2016, which is a continuation of U.S. patent application Ser. No. 14/089,588, filed on Nov. 25, 2013. The disclosures of these prior applications are considered part of the disclosure of this application and are hereby incorporated by reference in their entireties.

TECHNICAL FIELD

This disclosure relates to file operation task optimization.

BACKGROUND

This specification relates to optimizing file operation tasks in distributed systems.

A distributed system is a collection of networked computing devices or "nodes" working together to perform a computing task. In some cases, the computing task may involve analyzing a large amount of data by breaking the data into small chunks that can be handled in parallel by the nodes. The computing task may also involve storing large amounts of data in an efficient and fault tolerant manner. One system for performing such a task is a distributed file system.

Distributed file systems allow file data to be stored across different nodes. The system may store multiple copies of the data on different nodes so that the failure of a single node will not lead to loss or unavailability of the file data. In some cases, a distributed file system may allow clients to perform operations similar to those provided by a standard local file system, such as, for example, copying, deleting, and merging files. The clients may perform these operations by issuing file operation requests to nodes of the distributed file system, either directly or through a management application associated with the distributed file system.

SUMMARY

The subject matter of this application relates to optimizing file operation tasks in distributed systems through task clustering and division.

In general, one innovative aspect of the subject matter described in this specification can be embodied in methods that include the actions of receiving, by a data processing apparatus, a plurality of file operation requests, each file operation request including a priority, a deadline, and an operation type and representing a request to perform an operation on at least one file maintained in a distributed file system; identifying, by the data processing apparatus, a group of file operation requests to be executed together from the plurality of file operation requests, the identification based at least in part on at least one of: the file operations in the group of file operations being directed to a same storage system, or file operations in the group of file operations sharing a common operation type; and sending a request to execute the group of file operation requests to a system configured to perform the group of file operation requests. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By grouping file operation requests according to the techniques described herein, greater efficiency and performance may be achieved in a distributed file system. Overhead, such as network communication costs, associated with multiple file operation requests may be reduced, which may lead to increased system performance and throughput. Further, response time for file operation requests may be reduced as a higher volume of requests may be serviced at a higher rate than previous techniques.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The present disclosure relates to optimizing the scheduling of file operation tasks in a distributed file system.

Generally, file operation scheduling involves treating file operations as standalone tasks and scheduling a worker (e.g., a thread, process, and/or other processing resource, which is generally referred to as a "worker") to execute the tasks one at a time. Tasks are scheduling without considering the properties of the associated file operation, such as operation type, source, target, and/or other properties.

The present disclosure describes systems and methods for optimizing the scheduling of file operation tasks in a distributed file system by taking into account properties of the file operations to be executed. In some implementations, the execution of file operation tasks is managed in one or more file request managers. The systems may cluster file operations to reduce remote process call (RPC) or other communication overhead to nodes of an external file system on which the file operation tasks will execute. For example, a file request manager may determine that two "file copy" task requests may be issued together to the external file system in a single request. Issuing both task requests in a single request instead of two separate requests allows overhead associated with the extra request to be avoided. When higher degrees of clustering are obtained (e.g., more than two task requests clustered together) the overhead savings increases.

File operations can also be divided to improve end-to-end performance over unoptimized file operation scheduling methods. For example, the execution system may determining that a particular file operation request should be divided based on identifying another file operation request with which part of the particular file operation request can be grouped. For example, a wildcard delete operation for deleting all files matching a certain criteria may be divided to separate a file operation request to delete files for a certain node of the external file system in response to a determination that there is another file operation request for that node with which the divided request can be grouped.

In some implementations, file operation requests may include execution criteria that may be considered by the file request manager when performing optimization. The execution criteria may include hard deadlines, each indicating that a file operation task must be finished prior to the deadline, and soft deadlines, each indicating a best-to-have target time for completion of the task. For example, the file request manager may group file operation tasks together such that all tasks in the group may be completed before the earliest deadline associated with one of the file operation tasks in the group. The execution criteria may also include priorities, operation requirements specifying capabilities of a worker to execute the file operation, failure policies indicating how to handle the failure of the file operation task (e.g., retry, notify requestor, etc.), and/or other criteria. These features and additional features will be described in more detail below.

Figure 1:
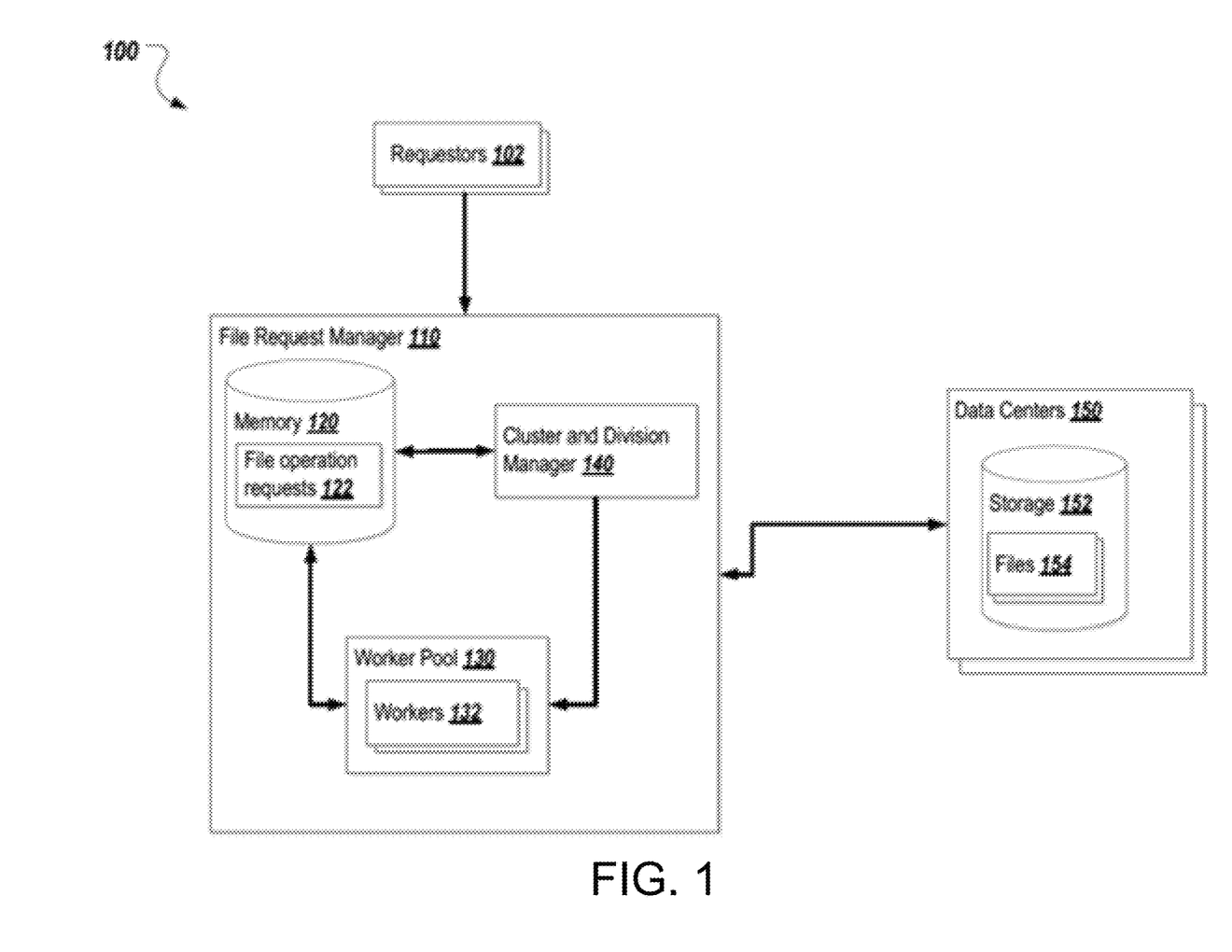
FIG. 1 is a block diagram of an environment in which file operation task optimizations occur.

FIG. 1 is a block diagram of an environment 100 in which dynamic reconfiguration of a shuffle operation can occur. The environment 100 includes one or more requestors 102, a file request manager 110, and one or more data centers 150. In operation, the requestors 102 provide file operation requests to the file request manager 110. The file request manager 110 performs cluster and division operations in order to create groups of file operation requests to send to the one or more data centers 150. The operations associated with the file operation requests are performed by the one or more data centers 150 on files 154 stored in associated storage 152.

The one or more requestors 102 may be components that generate file operation requests associated with an external file system. In some implementations, the requestors 102 may be applications, computing devices, threads, and/or other components. In some implementations, the requestors 102 may communicate with the file request manager 110 over a network (not shown). The requestors 102 may also communicate with the file request manager 110 by accessing methods of an application programming interface (API) associated with the file request manager 110. In such an implementation, the file request manager 110 may be a library, or other software component running on the same computing device as the requestor. In some implementations, the requestors 102 may be implemented in hardware, software, and/or a combination of the two.

The file request manager 110 may be a collection of one or more software processes running on the computing device accessible by the requestors 102. In some implementations, the file request manager 110 may execute on the same computing device as a particular requestor 102. Multiple file request managers 110 may also exist, such as, one file request manager 110 for each requestor 102, or one file request manager 110 for a group of requestors 102. In some implementations, the file request manager 110 may receive requests from the requestors 102 via a network (not shown). In such an implementation, the requests may be received according to any suitable API, including, but not limited to, Hypertext Transfer Protocol (HTTP), Simple Object Access Protocol (SOAP), Remote Procedure Call (RPC), and/or other APIs. The request may also be received via the requestors 102 calling methods associated with the file request manager 110, such as in a configuration where a requestor 102 and the file request manager 110 execute on the same computing device.

As shown, the file request manager 110 includes a memory 120. The memory 120 may include any type of memory or database module and may take the form of volatile and/or non-volatile memory including, without limitation, magnetic media, optical media, random access memory (RAM), read-only memory (ROM), removable media, or any other suitable local or remote memory component.

The memory 120 includes file operation requests 122. In some implementations, the file operation requests 122 are requests received from the requestors 102, and stored within a file system or database. The file operation requests 122 may include information associated with the store requests, including, but not limited to, hard deadlines, soft deadlines, priorities, source information, target information, failure policies, operation requirements, and/or other information. In some implementations, the file operation requests 122 may be indexed to allow the other components to perform optimization. An example structure for such index is presented in FIG. 2, and described below.

The file request manager 110 also includes a cluster and division manager 140. In operation, the cluster and division manager 140 examines the file operation requests 122, and determines cluster and division operations to perform on the file operation requests 122 to produce groups of file operation requests to be issued to the data centers 150. For example, if the file operation requests 122 include two file copy requests for files stored in the same one of the data centers 150, the cluster and division manager 140 may cluster these two file copy requests into a single request and issue the request to the data center 150. By clustering requests in this way, the cluster and division manager 140 may reduce communication and other overhead associated with issuing the file operation requests to the data centers 150.

In some implementations, the cluster and division manager 140 may be a software module within the file request manager 110 that periodically analyzes the file operation requests 122 in order to identify grouping opportunities. The cluster and division manager 140 may also examine file operation requests as they are received from the requestors 102 and identify possible grouping operations at that point. In some cases, the cluster and division manager 140 may be an external component from the file request manager 110, such as a computing device that communicates with the file request manager 110 over a network.

The file request manager 110 also includes a worker pool 130. The worker pool 130 includes one or more workers 132. A worker is a component capable of performing a file operation task by interacting with the data centers 150. In some implementations, the worker pool 130 provides an interface for the cluster and division manager 140 to request that a specific file operation request be performed. The worker pool 130 may store and manage the state of the various workers 132. For example, if a worker 132 is currently performing a file operation request, the worker pool 130 would note that the worker 132 is not available for new file operation requests. In some implementations, the worker pool 130 receives a reference to one or more of the file operation requests 122 from the cluster and division manager 140. The worker pool 130 then selects one of the workers 132 that is available (e.g., not currently performing a file operation task), and provides the worker 132 with the reference to the one or more file operation requests 122. The worker 132 then retrieves information about the file operation requests 122 from the memory 120, and interacts with the data centers 150 to perform the file operation requests 122.

In some implementations, the one or more workers 132 may be processes or threads executing within the file request manager 110. The one or more workers 132 may be configured to interact with an appropriate data center 150 to perform the file operation requests 122. For example, a worker 132 may be instructed by the worker pool 130 to execute a group of file copy requests from the file operation requests 122. The worker 132 may retrieve the group of file copy requests from the memory 120, and construct a file operation request including the group of file copy requests. In some implementations, the file operation request constructed by the worker 132 may be an RPC request to be sent to one of the one or more data centers 150. The RPC request includes necessary information for each of the file copy requests in the group to allow the request to be executed by the appropriate data center 150. Once the RPC request is sent, the worker 132 may wait for a response from the data center 150. Once the worker 132 receives the response, it may check the status code associated with the RPC request, and notify the requestors 102 associated with the file operation requests if an error has occurred. The worker 132 may then inform the worker pool 130 that it is available to process more file operation requests. Although the above example refers to the worker 132 sending an RPC request to request that the file operations be performed, the request to the data centers 150 may be made by other mechanisms, including, but not limited to, HTTP, SOAP, File Transfer Protocol (FTP), Secure Copy (scp), Remote Shell (rsh), Remote Execute (rexec), by issuing shell commands associated with the file operation requests directly to the data centers in implementations in which the workers 132 are co-located with the data centers 150, and/or other mechanisms.

In some cases, from the perspective of the requestors 102, the file request manager 110 may be a "black box." A requestor 102 inserts a file operation task to the file request manager 110 and does not control the execution and ordering of the task. A requestor 102 can provide metadata for each task to guide the file request manager 110 on how and when to schedule the task.

In some implementations, each file operation request 122 is associated with certain metadata to describe the operation. The metadata may include operation requirements describing capabilities necessary to execute the operation. The metadata may also include a priority indicating the urgency of the request. A higher priority task general is treated as a hint to schedule the task sooner than a lower priority task. The metadata may also include a deadline associated with the operation. Two example types of deadlines are a hard deadline and soft deadline. A hard deadline means the operation must be finished before the given timestamp or the task is aborted. A soft deadline means completion before the given timestamp is a best-to-have target, but the requestor does not expect the file request manager 110 to fail the task if file request manager 110 cannot fulfill the task on time.

The cluster and division manager 140 may perform clustering and division of the file operation requests 122 per operation type. For file deletion operations, files may be located in many of the data centers 150. In some cases, the cluster and division manager 140 analyzes target files associated with the file deletion operation requests. A file deletion operation request that contains target files on different ones of the data centers 150 may be divided into two or more separate file deletion operation requests so that each request contains an individual target file or directory. The cluster and division manager 140 may then cluster file deletion operation requests for target files of the same data center in one request to reduce the overhead associated with the request.

Regarding file copying, a file copying operation request contains a source target file and a destination location. The cluster and division manager 140 may analyze the request to cluster requests that have the same source target. The clustered requests may not necessarily have the same destination. The requests may be clustered in such a way so that copying of the same file can be handled by an external copier to cache the file on intermediate data centers hops during copy, thus reduce data transmissions between data centers.

Regarding file merging, a file merging operation request contains a list of source files and a file merged filename. The cluster and division manager 140 may analyze the requests to calculate common sublists of requests. A common sublist is a list of source files that are part of multiple requests' source file lists. The common sublists are premerged to reduce the final merging delay.

As shown, data centers 150 include storage 152 storing one or more files 154. In some implementations, the data centers 150 are nodes of a distributed file system, each storing a set of files 154. The data centers 150 may be computing devices connected to a network and may include various software processes, applications, and/or daemons operable to handle file operation requests. In some implementations, the data centers 150 may be configured to receive file operation requests according to one or more mechanisms, including, but not limited to, HTTP, FTP, RPC, and/or other mechanisms.

Figure 2:
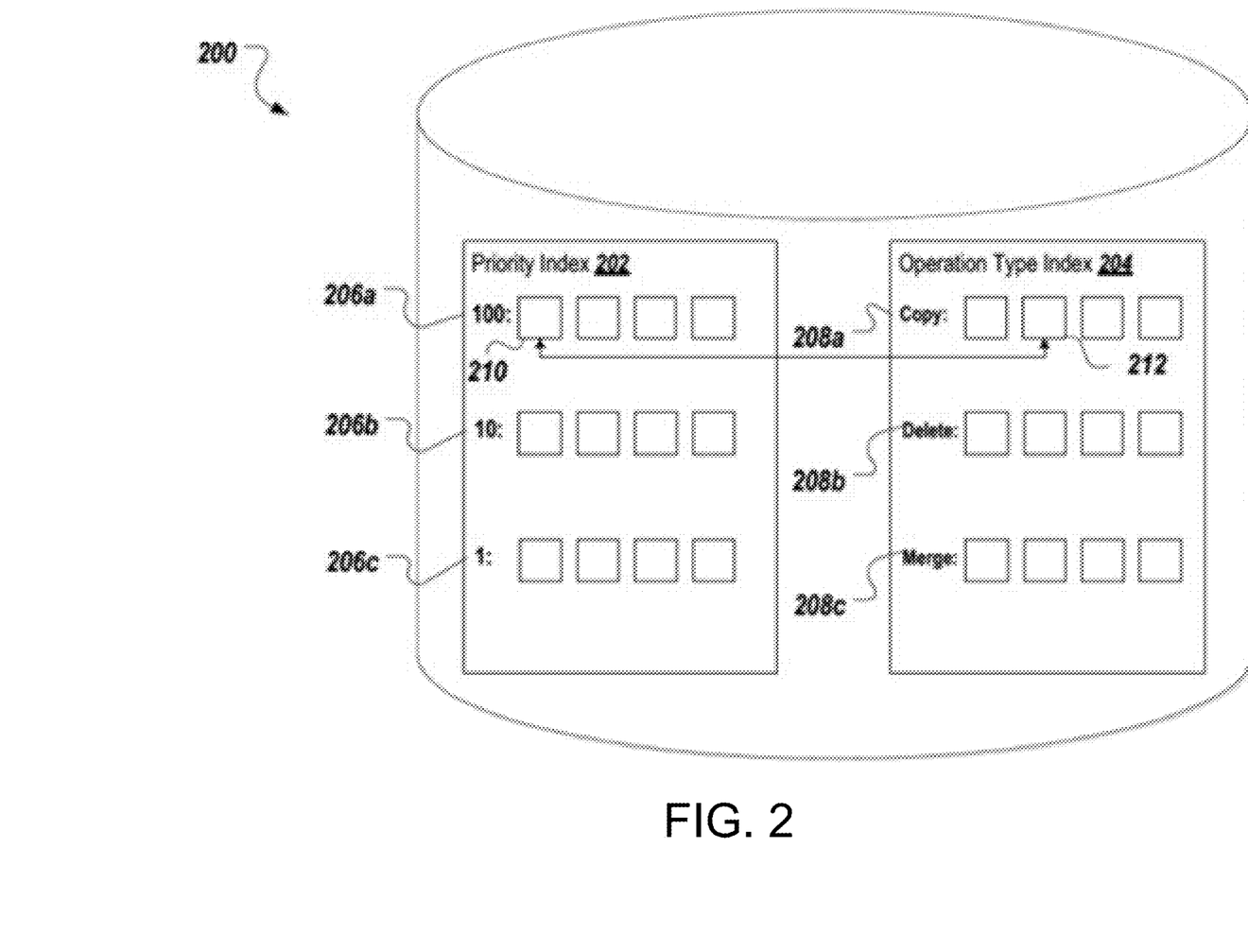
FIG. 2 is a block diagram of an example index of file operation tasks used for file operation task optimization.

FIG. 2 is a block diagram of an example index 200 of file operation requests used for file operation request optimization. The index 200 includes a priority index 202 that organizes file operation requests by priority, and operation type index 204 that organizes file operation requests by operation type. As shown, the priority index 202 and operation type index 204 each include one or more lists, 206a-c and 208a-c. Each list corresponds to a priority or operation type value, with each operation in the list sharing the same value. For example, lists 206a includes file operation request with a priority of 100. List 208A includes file operation requests with operation type of "copy." Each file operation request exists in exactly one of the priority lists 206a-c, and one of the operation type lists 208a-c. File operation requests in each priority list 208a-c may also be sorted by a time each request was received in an ascending order such that the oldest request appears first. File operation requests with a hard deadline may be listed in the beginning of the priority lists 206a-c, sorted by their deadlines in descending order such that the soonest appears first. By sorting the priority lists 206a-c in this way, the next file operation request to execute will appear first in each list.

To perform a clustering operation on the file operation requests, the cluster and division manager 140 may select the next file operation request 210 from the priority index 202. The cluster and division manager 140 may then identify a corresponding entry 212 for the same file operation request in the operation type index 204. The cluster and division manager 140 may then select the full operation type list in which the corresponding entry 212 appears to obtain the currently pending file operation requests having the same operation type as the next file operation request 210. The cluster and division manager 140 may then further filter this list to obtain a group of file operation requests to be clustered in a request for a data center 150. In some implementations, the cluster and division manager 140 may filter the file operation requests based on the criteria discussed previously, such as deadline, target data center, target file, source file, and/or other criteria.

Figure 3:
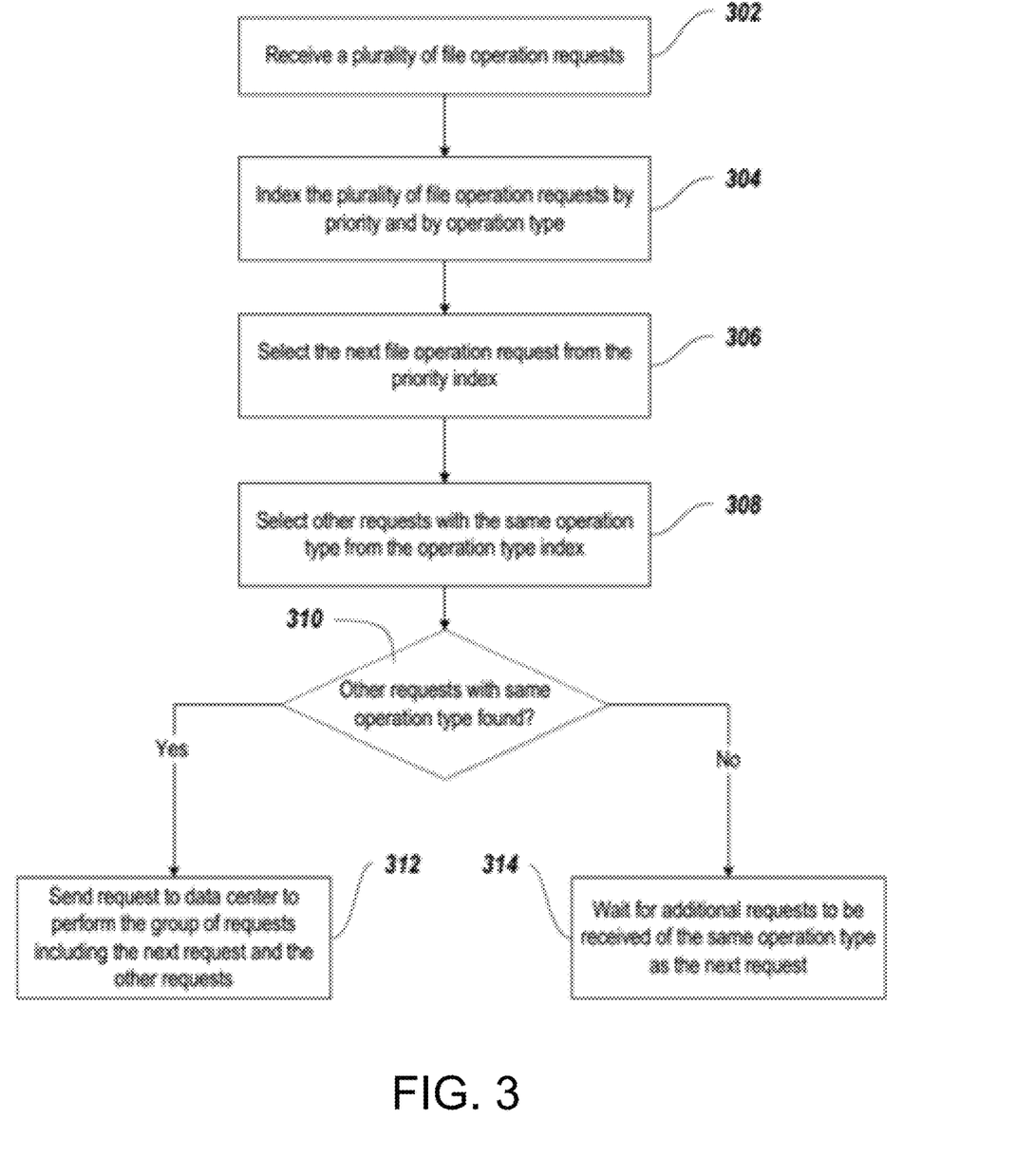
FIG. 3 is a flow diagram of an example process for file operation task optimization through request clustering.

FIG. 3 is a flow diagram of an example process 300 for file operation task optimization through request clustering. The process 300 can be implemented by the file request manager 110. The file request manager 110 receives a plurality of file operation requests (302). In some implementations, the file request manager 110 receives the plurality of file operation requests over a network. The file request manager 110 may also receive the plurality of requests via function calls performed by requestors according to an API.

The file request manager 110 indexes the plurality of file operation requests by priority and by operation type (304). In some implementations, the file request manager 110 may index the plurality of file operations to create an index structure similar or identical to the index 200 described relative to FIG. 2.

The file request manager 110 selects the next file operation request from the priority index 202 (306). In some implementations, the file request manager 110 selects the next file operation request by selecting the first element from the highest priority list in the priority index 202. The file request manager 110 then selects other requests with the same operation type as the type of the selected next file operation from the operation type index 204 (308).

The file request manager 110 then determines whether requests with the same operation type have been found (310). In some cases, the file request manager 110 may make this determination based on whether the operation type list 208a is empty. If requests with the same operation type are found, the file request manager 110 sends a request to a data center 150 corresponding to the requests to perform the group of requests, including the next request and the other requests (312). In some implementations, the file request manager 110 sends the request to the data center 150 as an RPC request including the group of requests. If no requests with the same operation type are found, the file request manager 110 waits for additional requests to be received of the same operation type as the next request (314).

Figure 4:
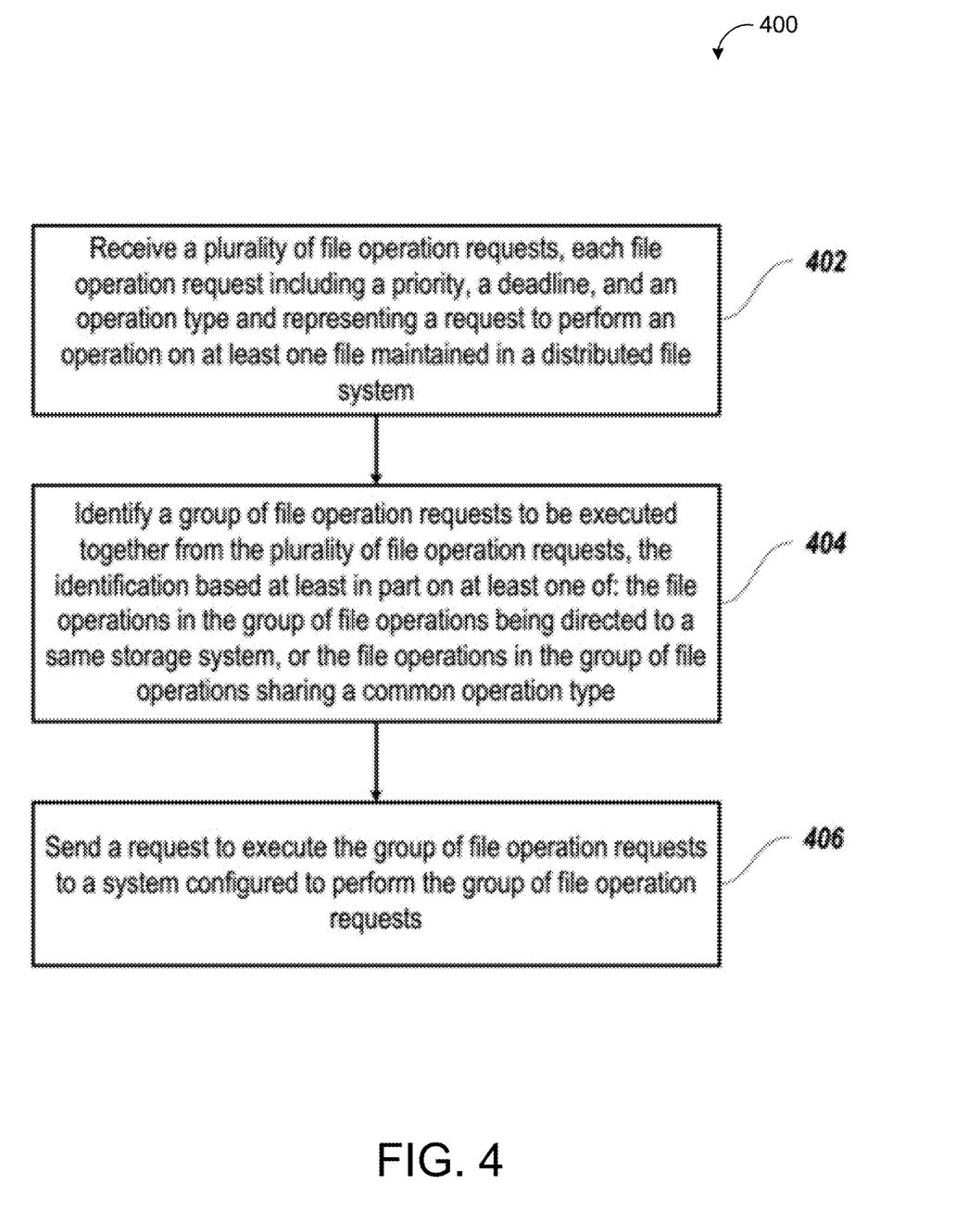
FIG. 4 is a flow diagram of an example process for file operation task optimization through request clustering.

FIG. 4 is a flow diagram of an example process 400 for file operation task optimization through request clustering. The process 400 can be implemented by the file request manager 110. The file request manager 110 receives a plurality of file operation requests (402). Each file operation requests includes a priority, deadline in operation type, and represents a request to perform an operation on at least one file maintained in a distributed file system.

The file request manager 110 identifies a group of file operation requests to be executed from the plurality of file operation requests (404). The identification of the group of file requests is based at least in part on at least one of: the file operations in the group of file operations being directed to a same storage system, such as directed to the same server, data center, or physical location, or the file operations in the group of file operation sharing a common operation type.

The file request manager 110 sends a request execute the group of file operation requests to a system configured to perform the group of file operation requests (406). In some implementations, the system configured to perform the group of file operation requests may be one of the data centers 150.

In some implementations, the file request manager 110 identifies the group of file operation requests to be executed together by determining that a particular file operation request should be divided into two or more divided file operation requests based at least in part on identifying a file operation request with which at least one of the two or more divided file operation requests can be grouped. In some cases, the identification is based at least in part on at least one of: the file operations to be grouped being directed to a same storage system, or the file operations to be grouped sharing a common operation type. The file request manager 110 may then divide the particular file operation request into two or more file operation requests. In some cases, the particular file operation request to be divided may be a deletion request.

In some cases, the file request manager 110 may wait an amount of time for additional file operation requests to be received upon determining that the plurality of request sets do not include one or more file operation requests having the same operation type as the first file operation request. For example, if the file request manager 110 only identifies a single copy request, and copy requests occur frequently, the file request manager 110 may wait for a certain amount of time in order to receive more copy requests to group with the single copy request.

Figure 5:
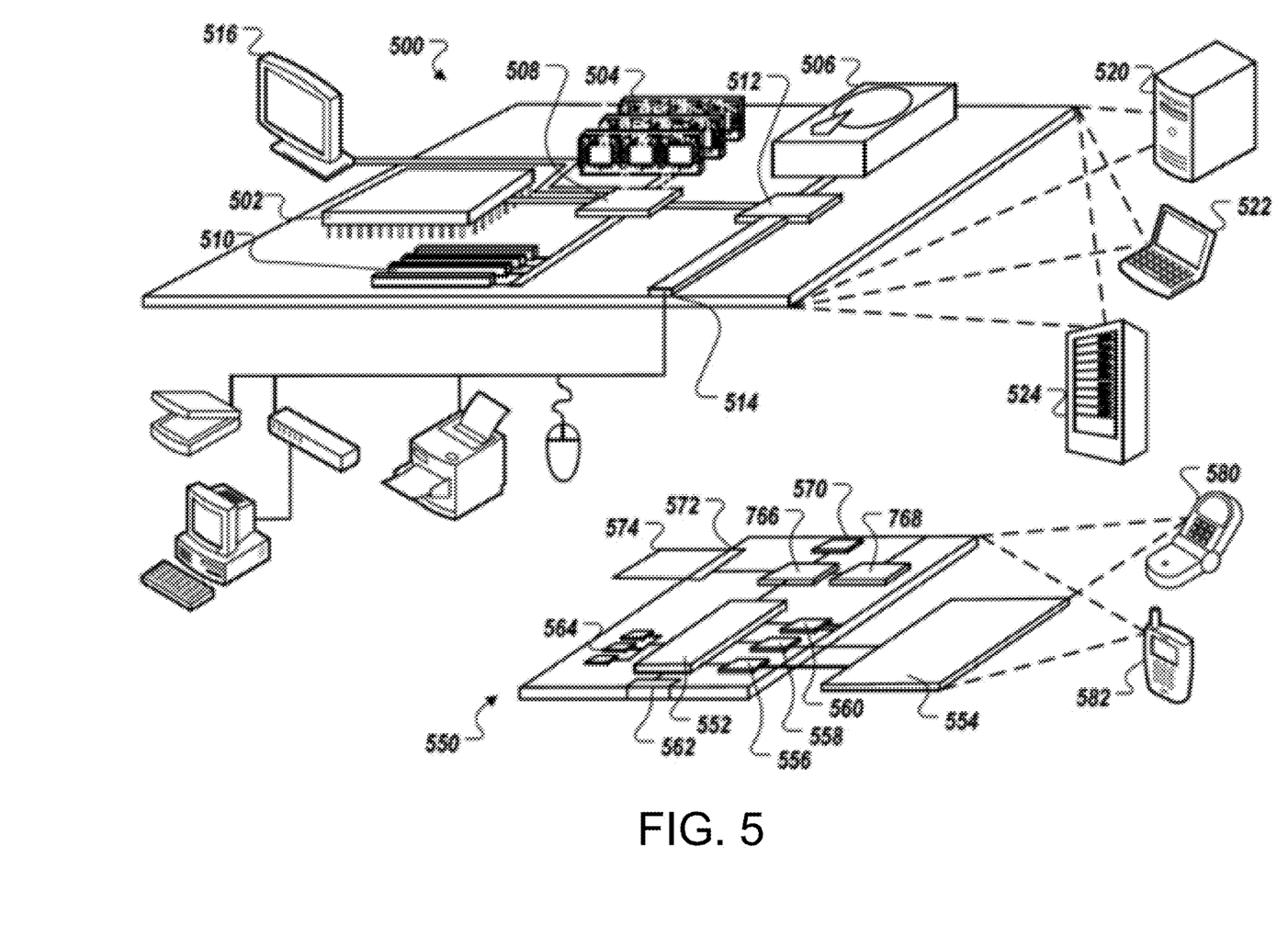
FIG. 5 is a block diagram of an example computing device.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed interface 508 manages bandwidth-intensive operations for the computing device 500, while the low speed interface 512 manages lower bandwidth-intensive operations. Such allocation of functions is exemplary only. In one implementation, the high-speed interface 508 is coupled to memory 504, display 516 (e.g., through a graphics processor or accelerator), and to high-speed expansion ports 510, which may accept various expansion cards (not shown). In the implementation, low-speed interface 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory 564 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method when executed on data processing hardware causes the data processing hardware to perform operations comprising:
    receiving a first operation request specifying an operation to perform on a file residing in a distributed file system, the operation specified by the first operation request comprising an operation type from among a plurality of different operation types;
    waiting a threshold amount of time after receiving the first operation request before requesting the distributed file system to perform the operation on the file;
    after receiving the first operation request and before the threshold amount of time is satisfied, receiving one or more additional operation requests specifying operations to perform;
    determining that each operation specified by the one or more additional operation requests comprises the same operation type as the operation specified by the first operation request;
    based on determining that each operation specified by the one or more additional operation requests comprises the same operation type as the operation specified by the first operation request, grouping the first operation request and each of the one or more additional operation requests into a group of operation requests;
    after grouping the first operation request and the one or more additional operation requests into the group of operation requests, determining the threshold amount of time is satisfied; and
    in response to determining the threshold amount of time is satisfied, sending a single request to the distributed file system requesting performance of each operation specified by the operation requests in the group of operation requests.

2. The computer-implemented method of claim 1, wherein the operation type comprises one or more of a file copy operation, a file deletion operation, or a file merge operation.

3. The computer-implemented method of claim 1, wherein each of the received operation requests comprise a priority indicating an urgency of the respective operation request.

4. The computer-implemented method of claim 1, wherein the operations further comprise:

determining that a particular operation request should be divided into two or more divided operation requests; and dividing the particular operation request into two or more operation requests.

5. The computer-implemented method of claim 1, wherein each of the received operation requests comprises a process association indicating a particular process of the respective operation request.

6. The computer-implemented method of claim 5, wherein the operations further comprise:

determining that the particular process of the respective operation request has terminated; and in response to determining that the particular process of the respective operation request has terminated, sending a request to execute the respective operation request.

7. The computer-implemented method of claim 1, wherein sending the single request comprises sending a remote procedure call.

8. The computer-implemented method of claim 1, wherein each of the received operation requests comprises a soft deadline and a hard deadline to execute the corresponding operation specified by the operation request.

9. The computer-implemented method of claim 8, wherein the operations further comprise:

identifying an operation request specifying an operation that will not be executed by the soft deadline of the identified operation request;

notifying a requestor associated with the identified operation request that the operation will not be complete before the soft deadline; and continuing execution of the operation specified by the identified operation request.

10. The computer-implemented method of claim 8, wherein the operations further comprise:

identifying an operation request specifying an operation that will not be executed by the hard deadline of the identified operation request; and aborting execution of the operation specified by the identified operation request.

11. A system comprising:

data processing hardware; and memory hardware in communication with the data processing hardware, the memory hardware storing instructions that when executed by the data processing hardware cause the data processing hardware to perform operations comprising:

receiving a first operation request specifying an operation to perform on a file residing in a distributed file system, the operation specified by the first operation request comprising an operation type from among a plurality of different operation types;

waiting a threshold amount of time after receiving the first operation request before requesting the distributed file system to perform the operation on the file;

after receiving the first operation request and before the threshold amount of time is satisfied, receiving one or more additional operation requests specifying operations to perform;

determining that each operation specified by the one or more additional operation requests comprises the same operation type as the operation specified by the first operation request;

based on determining that each operation specified by the one or more additional operation requests comprises the same operation type as the operation specified by the first operation request, grouping the first operation request and each of the one or more additional operation requests into a group of operation requests;

after grouping the first operation request and the one or more additional operation requests into the group of operation requests, determining the threshold amount of time is satisfied; and in response to determining the threshold amount of time is satisfied, sending a single request to the distributed file system requesting performance of each operation specified by the operation requests in the group of operation requests.

12. The system of claim 11, wherein the operation type comprises one or more of a file copy operation, a file deletion operation, or a file merge operation.

13. The system of claim 11, wherein each of the received operation requests comprise a priority indicating an urgency of the respective operation request.

14. The system of claim 11, wherein the operations further comprise:

determining that a particular operation request should be divided into two or more divided operation requests; and dividing the particular operation request into two or more operation requests.

15. The system of claim 11, wherein each of the received operation requests comprises a process association indicating a particular process of the respective operation request.

16. The system of claim 15, wherein the operations further comprise:

determining that the particular process of the respective operation request has terminated; and in response to determining that the particular process of the respective operation request has terminated, sending a request to execute the respective operation request.

17. The system of claim 11, wherein sending the single request comprises sending a remote procedure call.

18. The system of claim 11, wherein each of the received operation requests comprises a soft deadline and a hard deadline to execute the corresponding operation specified by the operation request.

19. The system of claim 18, wherein the operations further comprise:

identifying an operation request specifying an operation that will not be executed by the soft deadline of the identified operation request;

notifying a requestor associated with the identified operation request that the operation will not be complete before the soft deadline; and continuing execution of the operation specified by the identified operation request.

20. The system of claim 18, wherein the operations further comprise:

identifying an operation request specifying an operation that will not be executed by the hard deadline of the identified operation request; and aborting execution of the operations specified by the identified operation request.

* * * * *